April 18, 1939.   R. W. YOUNG, JR   2,154,799
TURNTABLE CENTER
Filed Dec. 16, 1936   3 Sheets-Sheet 2

April 18, 1939.     R. W. YOUNG, JR     2,154,799
TURNTABLE CENTER
Filed Dec. 16, 1936     3 Sheets-Sheet 3

Inventor
Robert W. Young, Jr.
By John E. Gardner
Atty

Patented Apr. 18, 1939

2,154,799

UNITED STATES PATENT OFFICE 2,154,799

TURNTABLE CENTER

Robert W. Young, Jr., Winnetka, Ill.

Application December 16, 1936, Serial No. 116,093

5 Claims. (Cl. 308—137)

The present invention relates to turntable centers, or more particularly to an improved form of turntable center bearing.

One of the objects of my invention is to provide a turntable center in which the bearing surfaces are protected from water and dirt.

Another object is to provide a turntable center in which the thrust load is widely distributed instead of being concentrated upon a center shaft.

Another object is to provide improved means for lubricating said bearing and sealing the lubricated portions from water and dirt.

A further object is to provide improved means for transferring the thrust load to the turntable center when a locomotive is run on to the turntable.

Still another object is to provide a turntable center which is readily adapted to various forms of turntables already in use.

There are other objects of my invention, which together with the foregoing will be described in the detailed specification which is to follow taken in conjunction with the accompanying drawings.

In practicing my invention I provide a base housing supporting a rotatable upper housing. Bearing surfaces are provided on the upper and lower housings. The lower housing carries an upstanding flange forming a recess into which the upper housing fits. A tiltable saddle block is supported on the upper housing and the turntable proper is adapted to be attached to the saddle block in any suitable manner.

The accompanying drawings illustrate a typical embodiment of my invention, and are now referred to.

Fig. 5 is a medial cross sectional view of the same.

In the drawings like reference characters apply to similar parts throughout.

Figure 2:
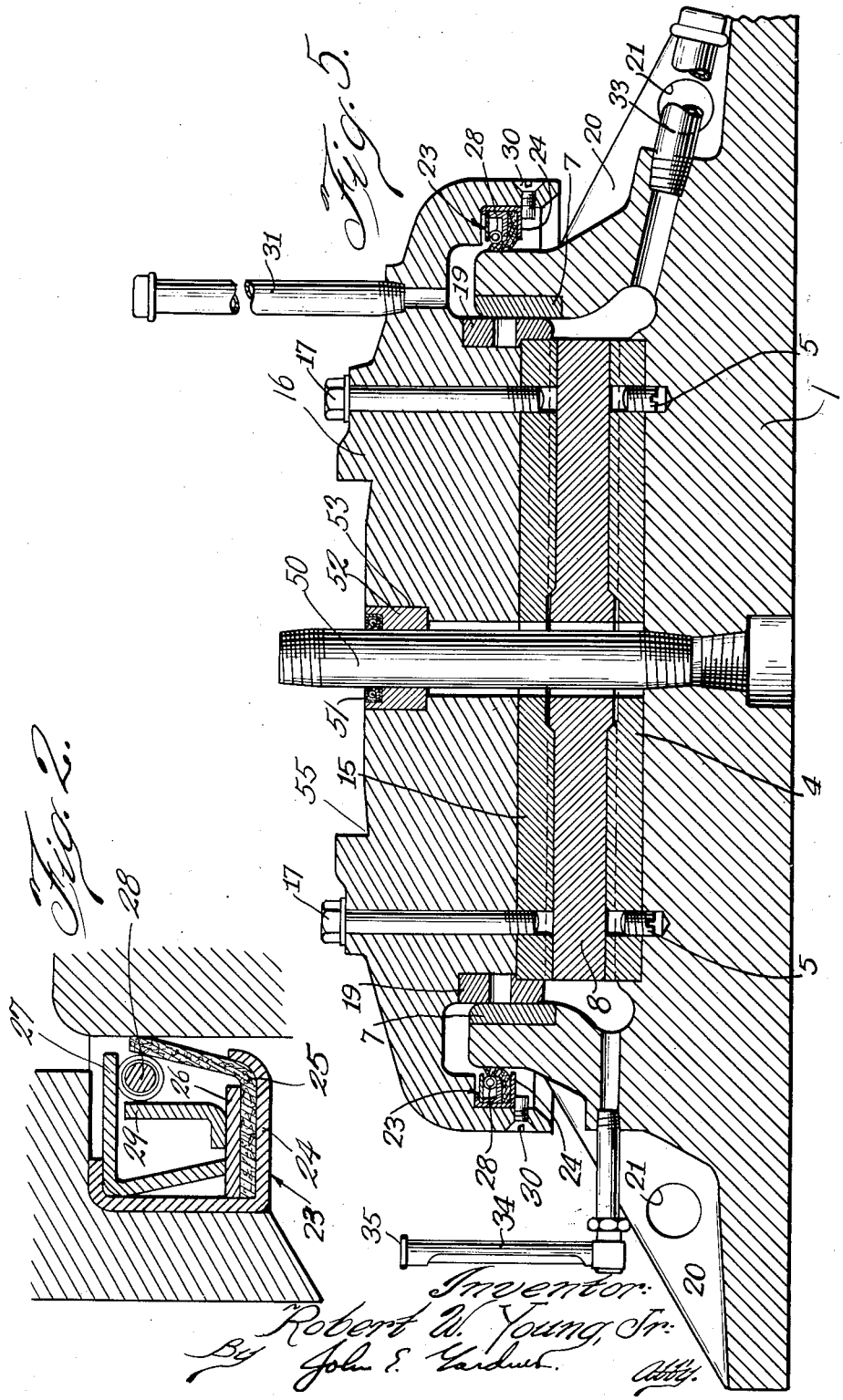
Fig. 2 is an enlarged detailed section of the oil sealing means employed.

The reference character 1 designates a base housing which is provided with a central upstanding annular flange 2 forming a central recessed portion 3 which provides space for mounting a bearing plate 4 of steel or other suitable material. The bearing plate 4 is provided with studs 5 which are threaded into openings therein, and fit within recesses 6 in the base casting to prevent rotation of the bearing plate 4. An annular bronze ring 7 is fitted or pressed into a recess upon the inner surface of the annular flange 2, and forms one of the bearing surfaces. A bronze plate or disc 8 is then placed upon the lower bearing disc 4, and is provided with a boss 9 cooperating with a recess 10 in the bearing disc 4. The lower bearing disc 4 is provided with suitable oil grooves 11. The center bronze bearing or disc 8 may be provided with a threaded central opening 12 so as to enable a bolt to be threaded therein for handling purposes. The bearing disc 8 is provided with an upper central boss 13 cooperating with a recess 14 in an upper bearing disc 15 which is affixed to an upper housing 16 by means of bolts 17. The upper disc 15 is also provided with suitable oil grooves 18. The upper housing has a steel ring 19 suitably pressed into the inner surface and adapted to cooperate with the bronze thrust ring 7 on the lower or base casting. The base casting 1 is provided with a number of webs 20 having openings 21 therein for strengthening and handling purposes. The upper casting 16 is also provided with a depending annular flange 22 and forms a recess for an oil seal 23 which comprises an L-shaped annular metal ring 24, (see Fig. 2) supporting a rawhide member 25 positioned between a disc member 26 and a V-shaped metal ring member 27. A tension spring 28 serves to hold the rawhide against the outer surface of the upwardly extending flange 2 of the base casting 1. A collar 29 serves to position the spring 28. The oil seal 23 is held in position on the depending flange 22 by friction or it may be held positively by positioning or retaining screws 30 in the depending flange 22 of the upper casting 16 (see Fig. 5). This enables the whole oil seal assembly to be readily removed. An oil pipe 31 is threaded into an opening in the upper casting and feeds into an annular opening 32 formed by the spacing between the upper and lower castings. An oil drain pipe 33 is threaded into the lower casting. The lower casting is also provided with a visional oil level gauge 34 having a threaded cap 35 for air venting purposes. The inner thrust ring 19 is provided with suitable oil grooves 36. The lower casting is so shaped as to form an annular reservoir 37 about the central bearing.

The upper casting 16 has a flat recess 38 formed along the top thereof adapted to receive a semi-cylindrically shaped shaft 39. The shaft 39 is circular in cross section at its ends 40 to prevent end-wise displacement thereof. A saddle block 41 is provided with a suitable semi-circular recess 42, and fits over the shaft 39. The recess 42 is so arranged that it covers the ends of the shaft 39 so as to prevent end-wise movement of the saddle block.

The saddle block is adapted to carry the turntable loading beams which are secured thereto in any suitable or desired manner. It will be seen that with the turntable loading beams secured to the saddle block that when a locomotive comes on to the turntable, the saddle block 41 rocks on the shaft 39, thereby compensating for the deflection in the turntable and transmitting the load evenly to the turntable center through the upper housing to the thrust bearings 19 and 7, and to the bearing discs 15, 8, and 4. It will be seen that because of the large surface of the bearing discs, the bearing will be amply able to carry the load and also by reason of the large thrust surfaces of the rings 19 and 7 which are positioned toward the outside of the center. This forms a very much stronger and more suitable construction than when a central shaft is employed in the bearing.

When the turntable center is placed in use the cap 35 is removed from the oil level gauge 34, and lubricating oil is poured into the oil pipe 31. The oil moves through the various grooves and completely covers all bearing surfaces. When the oil level gauge shows full the cap 35 is replaced thereon, and the oil pipe 31 further filled to the top to provide for further supply. The oil seal 23 effectively prevents any leakage of the oil from the bearings, and it will be seen that the bearings will remain covered with oil so long as the supply lasts. The depending flanges 22 of the upper housing function to prevent any rain getting into the bearings, and at the same time the oil seal 23 effectively protects the bearings against dirt and any water from the outside, due to flooding of the turntable pit.

The turntable of course, may be operated either by motor or by hand in any well known manner.

It will be seen that I have provided a very effective turntable center in which the enormous load of the locomotive is distributed over the entire bearing so that it may carry much greater loads than ordinary, with a great deal less strain and in fact, the bearing may be constructed considerably lighter than is usually the case. The construction is such that all parts of the bearing are readily accessible and may be removed for repair or replacement.

Figure 4:
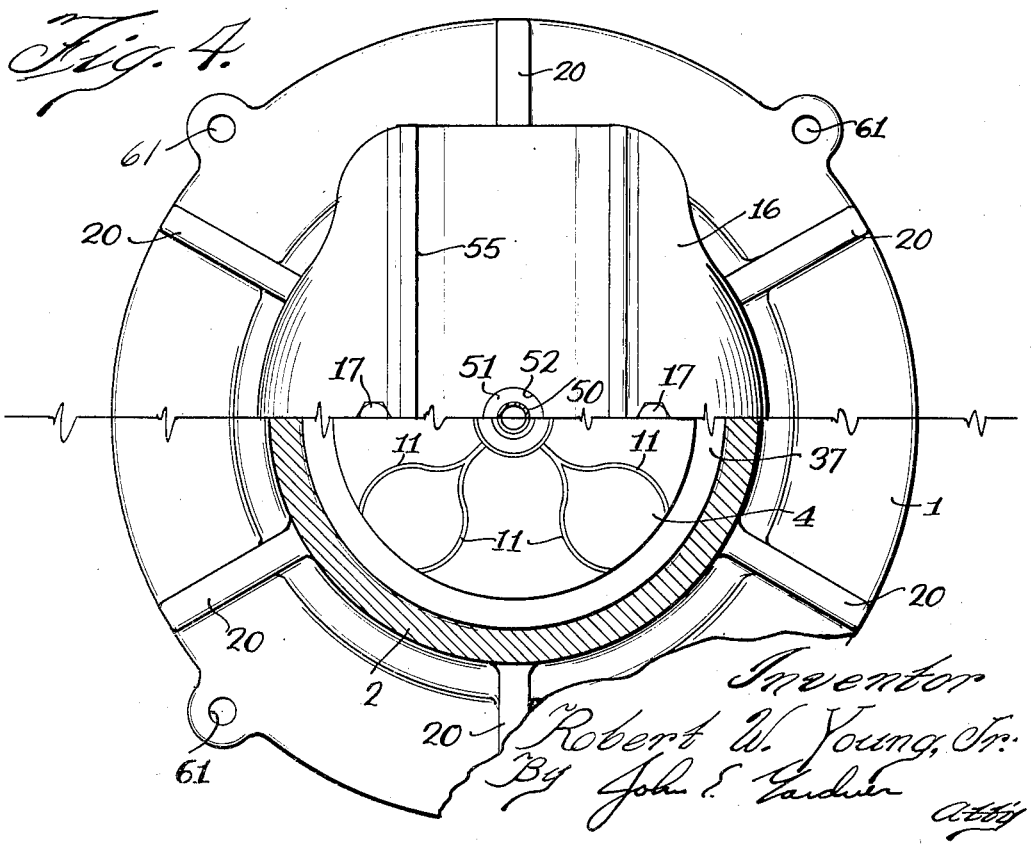
Fig. 4 is another plan showing a modified form of the upper housing.

In Figs. 4 and 5, I have shown a slightly modified form of construction where a central pipe 50 may run through both the upper and lower housings into which may be fitted cables for the supply of electric energy or air conduits. In this form of construction an oil seal 51 is provided at the upper end of the pipe 50 effectively to seal the bearings discs 15, 8, and 4 against the ingress of water or dirt about the pipe 50. The oil seal 51 is held in a pipe bushing 52 mounted in a recess 53 in the upper casting 16. The oil seal 51 is constructed similarly to the oil seal previously described, though it may be of any other suitable or desired construction, as may the oil seal 23.

Figure 1:
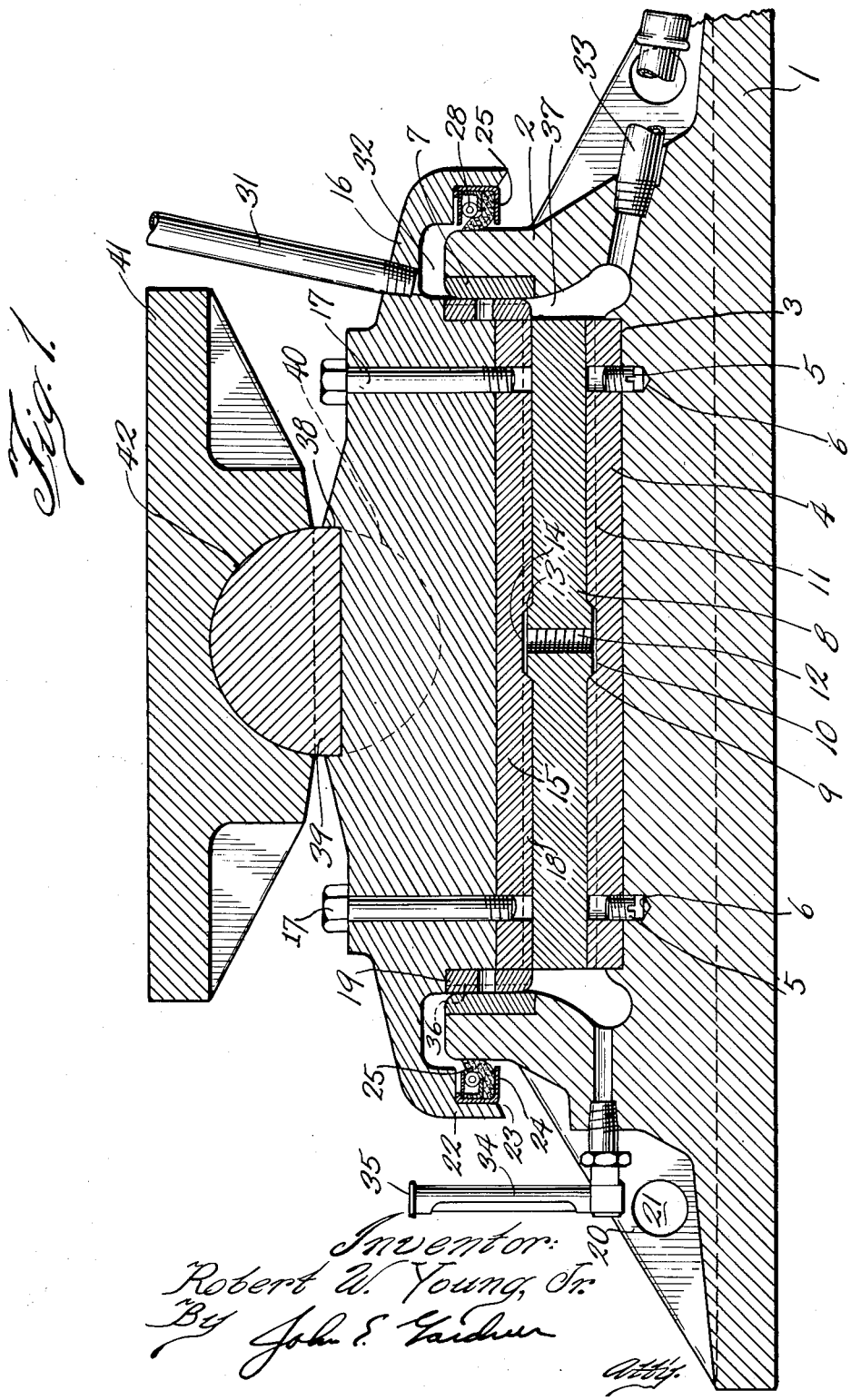
Fig. 1 is a medial cross sectional view of my improved turntable center.
Figure 3:
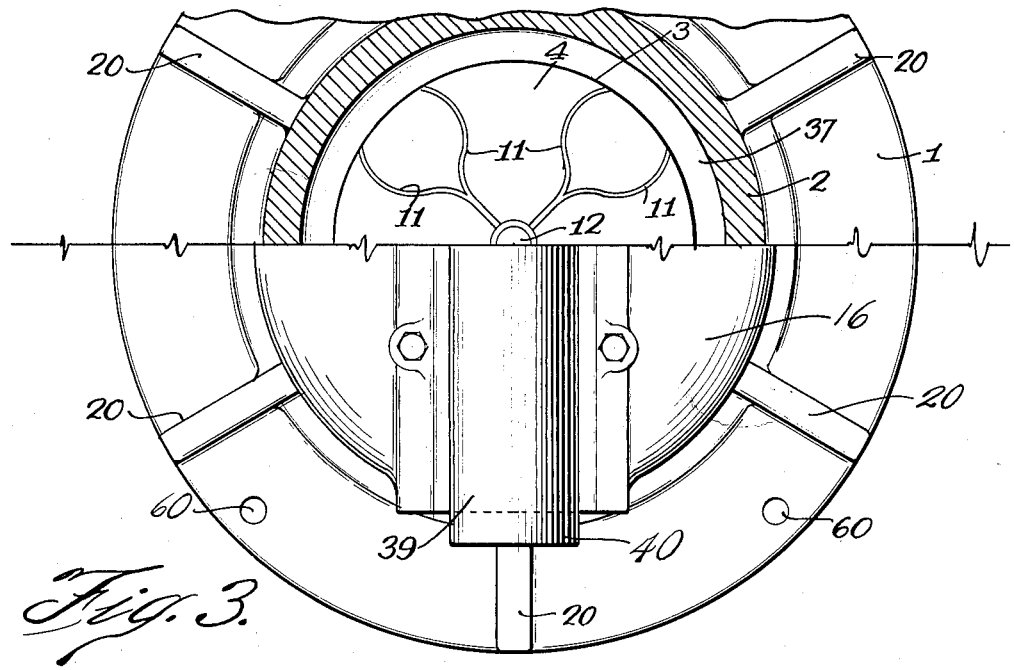
Fig. 3 is a plan of the center with a certain portion of the upper housing cut away.

Attention is directed to the fact that in the construction shown in Figs. 4 and 5, the upper housing 16 is provided with a rectangular shaped recess 55. This form of construction may be resorted to where one of the single loading beam type turntables is employed, the beam or thrust of the turntable fitted within the recess 55 of the upper casting 16, otherwise the construction is identical with that shown in Figs. 1, 2 and 3.

The conduit pipe 50 may be threaded into an opening in the lower casting 1 and in any desired manner so as to provide an effective oil seal at the bottom. I have shown a somewhat conical shaped opening in Fig. 5 to illustrate one possible construction. It is understood of course, that the base casting 1 may be suitably mounted by bolts passing through openings 60 or 61 in the base casting 1.

From the above and foregoing description it is believed to be obvious that applicant has provided a very effective turntable center bearing. It can be seen that the turntable superstructure can easily be fastened upon the platform 41 and thus when a locomotive is run onto the turntable, the entire weight of the same will be pivotally supported upon the hemispherical shaft 39, and in the event it is desired to turn the turntable, it can be seen that the bearing surfaces which will carry the weight, and which will have the frictional engagement during the rotation, are the ring elements 7 and 19 and the bearing plates 4 and 15. The interposition of the bronze plate 8 between these plates very effectively prevents the wear of the same and in the event the bronze plate is gradually worn out, it can always be replaced without disturbing the balance of the mechanism.

It will be obvious that oil that has been forced into the reservoirs 37 and 32 is prevented from leaking out by the vertical flange of the gasket 25. It will be further obvious that dirt and dust, or water which may collect in the turntable pit will be prevented from reaching the bearing surfaces, previously mentioned, by the sealing gasket previously described.

My invention may be variously modified without departing from the spirit and scope thereof as indicated in the appended claims.

I claim:

1. A turntable center comprising a horizontally disposed base having an annular upstanding flange, a bearing ring secured in a recess in the inner wall of said flange, a flat circular platform on said base surrounded by said annular flange, a flat bearing plate secured to said base, a housing above said base having a cylindrical portion telescoping within said annular upstanding flange, a bearing plate secured thereto and facing said first named bearing plate, a depending annular flange surrounding said upstanding flange, a bearing ring in the inner wall of said depending flange telescoped within said first mentioned bearing ring, an oil seal comprising a circular gasket between said depending and upstanding flanges and spring means for holding said gasket in engagement with both of said flanges.

2. A turntable center comprising a horizontally disposed base having an annular upstanding flange, a bearing ring secured in a recess in the inner wall of said flange, a flat circular platform on said base, surrounded by said annular flange, a flat bearing plate secured to said base, a housing above said base having a cylindrical portion telescoping within said annular upstanding flange, a bearing plate secured thereto and facing said first named bearing plate, a depending annular flange surrounding said upstanding flange, a bearing ring in the inner wall of said depending flange telescoped within said first mentioned bearing ring and an oil seal between said depending and upstanding flanges.

3. A turntable center comprising a horizontally disposed base having an annular upstanding flange, a bearing ring secured in a recess in the inner wall of said flange, a flat circular platform on said base surrounded by said annular flange, a flat bearing plate secured to said platform, a housing above said base having a cylindrical portion telescoping within said annular upstanding flange, a bearing plate secured thereto and facing said first named bearing plate, a depending annular flange surrounding said upstanding flange, a bearing ring in the inner wall of said depending flange telescoped within said first mentioned bearing ring, an oil seal comprising a circular gasket between said depending and upstanding flanges, spring means for holding said gasket in engagement with both of said flanges and means positioned on the top of said housing for supporting a turntable.

4. A turntable center comprising a horizontally disposed base having an annular upstanding flange, a bearing ring secured in a recess in the inner wall of said flange, a flat circular platform on said base surrounded by said annular flange, a flat bearing plate secured on said platform, a housing above said base having a cylindrical portion telescoping within said annular upstanding flange, a bearing plate secured thereto and facing said first named bearing plate, a bronze wearing plate between said bearing plates, a depending annular flange surrounding said upstanding flange, a bearing ring in the inner wall of said depending flange telescoped within said first mentioned bearing ring, an oil seal comprising a circular gasket between said depending and upstanding flanges and spring means for holding said gasket in engagement with both of said flanges.

5. A turntable center comprising a horizontally disposed base having an annular upstanding flange, a bearing ring secured in a recess in the inner wall of said flange, a flat circular platform on said base surrounded by said annular flange, a flat bearing plate secured on said platform, a housing above said base having a cylindrical portion telescoping within said annular upstanding flange, a bearing plate secured thereto and facing said first named bearing plate, a bronze wearing plate between said bearing plates, a depending annular flange surrounding said upstanding flange, a bearing ring in the inner wall of said depending flange telescoped within said first mentioned bearing ring, an oil seal comprising a circular gasket between said depending and upstanding flanges and spring means for holding said gasket in engagement with both of said flanges, said spring means arranged in a ring about a vertically disposed portion of said gasket.

ROBERT W. YOUNG, JR.